United States Patent
Scanlon et al.

(10) Patent No.: US 10,166,523 B2
(45) Date of Patent: Jan. 1, 2019

(54) SUPPORT STRUCTURE FOR A BODY OF POLYCRYSTALLINE DIAMOND MATERIAL DURING LEACHING

(71) Applicants: Element Six Abrasives S.A., Luxembourg (LU); Element Six Limited, Country Clare (IE)

(72) Inventors: Terry Scanlon, County Clare (IE); Desmond Kenneth Sullivan, County Clare (IE); James Doyle, County Clare (IE); James Martin Redmond, County Clare (IE); Humphrey Samkelo Lungisani Sithebe, Springs (ZA)

(73) Assignee: Element Six Limited, County Clare (IE)

(*) Notice: Subject to any disclaimer, the term of this patent is extended or adjusted under 35 U.S.C. 154(b) by 259 days.

(21) Appl. No.: 14/758,586

(22) PCT Filed: Dec. 23, 2013

(86) PCT No.: PCT/EP2013/077929
§ 371 (c)(1),
(2) Date: Jun. 30, 2015

(87) PCT Pub. No.: WO2014/102247
PCT Pub. Date: Jul. 3, 2014

(65) Prior Publication Data
US 2015/0352514 A1    Dec. 10, 2015

Related U.S. Application Data

(60) Provisional application No. 61/747,801, filed on Dec. 31, 2012.

(30) Foreign Application Priority Data
Dec. 31, 2012    (GB) .................................. 1223523.0

(51) Int. Cl.
*E21B 10/46* (2006.01)
*C08K 5/13* (2006.01)
(Continued)

(52) U.S. Cl.
CPC ................. *B01J 19/02* (2013.01); *B01J 3/03* (2013.01); *B01J 3/062* (2013.01); *B24D 18/00* (2013.01);
(Continued)

(58) Field of Classification Search
CPC . B24D 18/00; E21B 10/46; C08K 5/13; B01J 3/03; B01J 2203/062; B01J 2203/0685; B01J 2203/0655
See application file for complete search history.

(56) References Cited

U.S. PATENT DOCUMENTS

2006/0060390 A1    3/2006    Eyre
2007/0060688 A1*   3/2007    Wang .................... C08G 65/40
                                                             524/323

(Continued)

FOREIGN PATENT DOCUMENTS

GB    2418215 B    7/2010
WO    2008096314 A2    8/2008
(Continued)

OTHER PUBLICATIONS

Search Report for GB1223523.0 dated Apr. 15, 2013.
(Continued)

*Primary Examiner* — Pegah Parvini
(74) *Attorney, Agent, or Firm* — Armstrong Teasdale LLP

(57) ABSTRACT

A support structure (40) for a PCD element (10) comprises a support (42) into which a PCD element (10) is locatable and a sealing element (48) for location in the support structure (40) and configured to protect a non-leached portion of a PCD element (10) during a leaching process. The
(Continued)

support (42) is formed from or coated with a polyketone based plastics material.

9 Claims, 2 Drawing Sheets

(51) Int. Cl.
*B01J 19/02* (2006.01)
*B24D 18/00* (2006.01)
*C04B 41/91* (2006.01)
*C04B 41/53* (2006.01)
*B01J 3/03* (2006.01)
*B01J 3/06* (2006.01)

(52) U.S. Cl.
CPC .............. *C04B 41/53* (2013.01); *C04B 41/91* (2013.01); *B01J 2203/062* (2013.01); *B01J 2203/0655* (2013.01); *B01J 2203/0685* (2013.01)

(56) References Cited

U.S. PATENT DOCUMENTS

| | | |
|---|---|---|
| 2007/0169419 A1 | 7/2007 | Davis et al. |
| 2007/0284152 A1* | 12/2007 | Eyre ........................ C22C 26/00 175/405.1 |
| 2010/0239483 A1 | 9/2010 | Middlemiss |

FOREIGN PATENT DOCUMENTS

| | | |
|---|---|---|
| WO | 2011080685 A2 | 7/2011 |
| WO | 2011141898 A1 | 11/2011 |

OTHER PUBLICATIONS

Search Report for GB1322895.2 dated Jul. 16, 2014.
International Search Report for PCT/EP2013/077929 dated Mar. 18, 2014.

\* cited by examiner

SUPPORT STRUCTURE FOR A BODY OF POLYCRYSTALLINE DIAMOND MATERIAL DURING LEACHING

CROSS-REFERENCE TO RELATED APPLICATIONS

This application is a National Stage of International Application No. PCT/EP2013/077929, filed Dec. 23, 2013, which claims priority to GB 1223523.0, filed Dec. 31, 2012 and claims the benefit of U.S. Provisional Application 61/747,801, filed Dec. 31, 2012.

FIELD

This disclosure relates to a support structure for holding a body of PCD material during processing and a method of processing a body of polycrystalline diamond (PCD) material.

BACKGROUND

Cutter inserts for machining and other tools may comprise a layer of polycrystalline diamond (PCD) bonded to a cemented carbide substrate. PCD is an example of a super-hard material, also called superabrasive material, which has a hardness value substantially greater than that of cemented tungsten carbide.

Components comprising PCD are used in a wide variety of tools for cutting, machining, drilling or degrading hard or abrasive materials such as rock, metal, ceramics, composites and wood-containing materials. PCD comprises a mass of substantially inter-grown diamond grains forming a skeletal mass, which defines interstices between the diamond grains. PCD material comprises at least about 80 volume % of diamond and may be made by subjecting an aggregated mass of diamond grains to an ultra-high pressure of greater than about 5 GPa, typically about 5.5 GPa, and temperature of at least about 1200° C., typically about 1440° C., in the presence of a sintering aid, also referred to as a catalyst material for diamond. Catalyst material for diamond is understood to be material that is capable of promoting direct inter-growth of diamond grains at a pressure and temperature condition at which diamond is thermodynamically more stable than graphite.

Examples of catalyst materials for diamond are cobalt, iron, nickel and certain alloys including alloys of any of these elements. PCD may be formed on a cobalt-cemented tungsten carbide substrate, which may provide a source of cobalt catalyst material for the PCD.

During sintering of the body of PCD material, a constituent of the cemented-carbide substrate, such as cobalt from a cobalt-cemented tungsten carbide substrate, liquefies and sweeps from a region adjacent the volume of diamond particles into interstitial regions between the diamond particles. In this example, the cobalt acts as a catalyst to facilitate the formation of bonded diamond grains. Optionally, a metal-solvent catalyst may be mixed with diamond particles prior to subjecting the diamond particles and substrate to the HPHT process. The interstices within PCD material may at least partly be filled with the catalyst material. The intergrown diamond structure therefore comprises original diamond grains as well as a newly precipitated or re-grown diamond phase, which bridges the original grains. In the final sintered structure, catalyst/solvent material generally remains present within at least some of the interstices that exist between the sintered diamond grains.

The sintered PCD has sufficient wear resistance and hardness for use in aggressive wear, cutting and drilling applications. However, a well-known problem experienced with this type of PCD compact is that the residual presence of solvent/catalyst material in the microstructural interstices has a detrimental effect on the performance of the compact at high temperatures as it is believed that the presence of the solvent/catalyst in the diamond table reduces the thermal stability of the diamond table at these elevated temperatures. For example, the difference in thermal expansion coefficient between the diamond grains and the solvent/catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the solvent/catalyst. At extremely high temperatures, portions of diamond grains may transform to carbon monoxide, carbon dioxide, graphite, or combinations thereof, thereby degrading the mechanical properties of the PCD material.

A potential solution to these problems is to remove the catalyst/solvent or binder phase from the PCD material.

Chemical leaching is often used to remove metal-solvent catalysts, such as cobalt, from interstitial regions of a body of PCD material, for example from regions adjacent the working surfaces of the PCD. Conventional chemical leaching techniques often involve the use of highly concentrated, toxic, and/or corrosive solutions, such as aqua regia and mixtures including hydrofluoric acid (HF), to dissolve and remove metallic-solvent/catalysts from polycrystalline diamond materials. As such mixtures are highly toxic, the use of these carries severe health and safety risks and therefore processes for treating PCD with such mixtures must be carried out by specialised personnel under well-controlled and monitored conditions to minimise the risk of injury to the operators of such processes.

With the development of alternative leaching mixtures to address the above-mentioned problems, it has been observed that problems are arising in the use of conventional fixtures for supporting the PCD material in the leaching mixture in that conventional materials such as PTFE used to form or coat such fixtures disintegrates rapidly either after one or two uses or during the leaching process itself. This is undesirable for a number of reasons as it is expensive and time consuming to keep replacing the fixtures. Also, if disintegration occurs during the treatment process itself it may result in the PCD element being leached having to be discarded. Furthermore, it could cause a potential health and safety risk if leakage of the corrosive acid leaching mixture occurs.

There is therefore a need to overcome or substantially ameliorate the above-mentioned problems through the provision of a supporting fixture which does not disintegrate during use, in particular in combination with specific mixtures used for treating or processing a body of PCD material.

SUMMARY

Viewed from a first aspect there is provided a support structure for a PCD element comprising a support into which a PCD element is locatable; and a sealing element for location in the support structure and configured to protect a non-leached portion of a PCD element during a leaching process, said support being formed from or coated with a polyketone based plastics material.

Viewed from a second aspect there is provided a PCD element leaching system comprising the support structure defined above and a leaching vessel configured to contain the support structure and PCD element during a leaching process.

Viewed from a third aspect there is provided a method of processing a body of polycrystalline diamond (PCD) material having a non-diamond phase comprising a diamond catalyst/solvent and/or one or more metal carbides, the method comprising:
- locating the body of PCD material to be processed in a support formed of or coated with a polyketone based plastics material;
- forming a sealing closure between the body PCD material and the support to separate a region of the body of PCD material to be treated from a region not to be treated;
- inserting the body of PCD material and support into a leaching vessel, the leaching vessel containing an amount of leaching mixture; and
- leaching an amount of the diamond catalyst/solvent and/or one or more metal carbides from the PCD material by exposing at least a portion of the PCD material to the leaching mixture.

In some embodiments, the leaching mixture comprises nitric acid diluted in water, the nitric acid comprising between around 2 to 5 wt % in the nitric acid and water mixture, and one or more additional mineral acids.

BRIEF DESCRIPTION OF THE DRAWINGS

Various embodiments will now be described in more detail, by way of example only, and with reference to the accompanying figures in which.

The same reference numbers refer to the same respective features in all drawings.

DETAILED DESCRIPTION OF EMBODIMENTS

As used herein, "PCD material" is a material that comprises a mass of diamond grains, a substantial portion of which are directly inter-bonded with each other and in which the content of diamond is at least about 80 volume of the material. In one embodiment of PCD material, interstices among the diamond gains may be at least partly filled with a binder material comprising a catalyst for diamond and/or a non-diamond phase.

As used herein, "catalyst material for diamond" is a material that is capable of promoting the growth of diamond or the direct diamond-to-diamond inter-growth between diamond grains at a pressure and temperature at which diamond is thermodynamically more stable than diamond.

The term "molar concentration" as used herein, refers to a concentration in units of mol/L at a temperature of approximately 25[deg.] C. For example, a solution comprising solute A at a molar concentration of 1 M comprises 1 mol of solute A per liter of solution.

Figure 1:
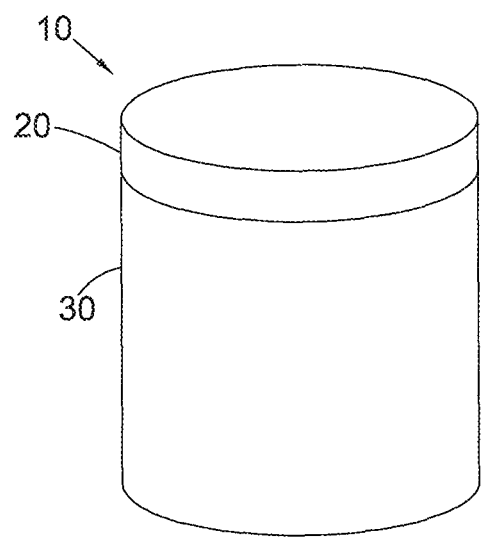
FIG. 1 is a schematic perspective view of a PCD cutter insert for a cutting drill bit for boring into the earth.

FIG. 1 shows a PCD cutter insert 10 for a drill bit (not shown) for boring into the earth, comprising a PCD body 20 bonded to a cemented tungsten carbide substrate 30.

Figure 2:
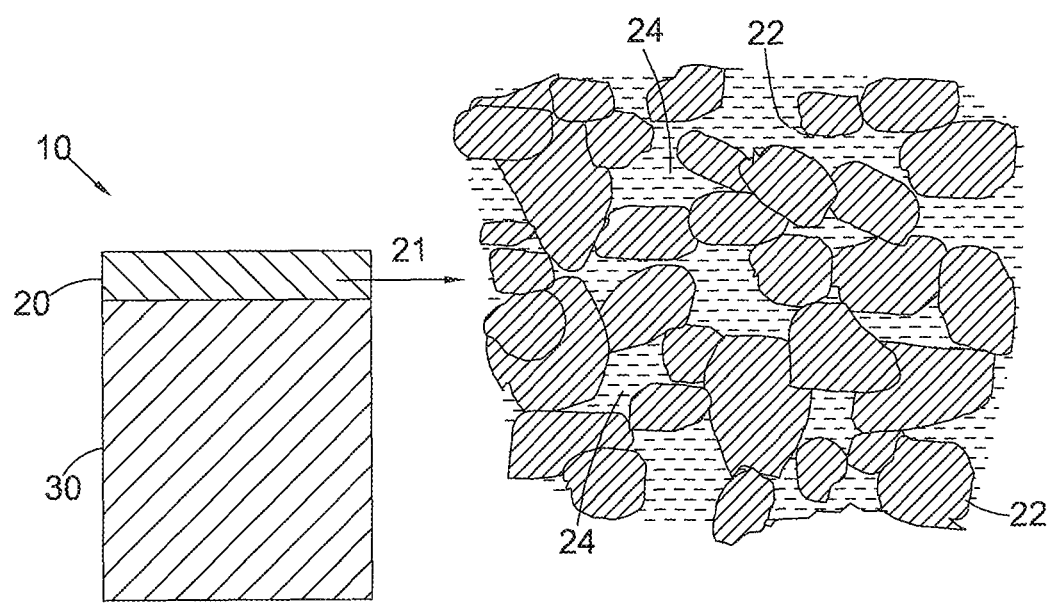
FIG. 2 is a schematic cross sectional view of the PCD cutter insert of FIG. 1 together with a schematic expanded view showing the microstructure of the PCD material.

FIG. 2 is a cross-section through the PCD cutter insert 10 of FIG. 1. The microstructure 21 of the PCD body 20 is also shown and comprises a skeletal mass of inter-bonded diamond grains 22 defining interstices 24 between the diamond grains, the interstices 24 being at least partly filled with a filler material comprising, for example, cobalt, nickel or iron. The filler material in the interstices 24 may also or in place of contain one or more other non-diamond phase additions such as for example, Titanium, Tungsten, Niobium, Tantalum, Zirconium, Molybdenum, Chromium, or Vanadium, the content of one or more of these within the filler material being, for example about 1 weight % of the filler material in the case of Ti, and, in the case of V, the content of V within the filler material being about 2 weight % of the filler material, and, in the case of W, the content of W within the filler material being about 20 weight % of the filler material.

PCT application publication number WO2008/096314 discloses a method of coating diamond particles, which has opened the way for a host of unique polycrystalline ultrahard abrasive elements or composites, including polycrystalline ultrahard abrasive elements comprising diamond in a matrix selected from materials selected from a group including VN, VC, HfC, NbC, TaC, $Mo_2C$, WC. PCT application publication number WO2011/141898 also discloses PCD and methods of forming PCD containing additions such as vanadium carbide to improve, inter alia, wear resistance.

Whilst wishing not to be bound by any particular theory, the combination of metal additives within the filler material may be considered to have the effect of better dispersing the energy of cracks arising and propagating within the PCD material in use, resulting in altered wear behaviour of the PCD material and enhanced resistance to impact and fracture, and consequently extended working life in some applications.

A sintered body of PCD material may therefore be created having diamond to diamond bonding and having a second phase comprising catalyst/solvent and WC (tungsten carbide) dispersed through its microstructure together with or instead of a further non-diamond phase carbide such as VC. The body of PCD material may be formed according to standard methods, for example as described in PCT application publication number WO2011/141898, using HpHT conditions to produce a sintered PCD table. The PCD tables to be leached by embodiments of the method typically, but not exclusively, have a thickness of about 1.5 mm to about 3.0 mm.

It has been found that the removal of non-binder phase from within the PCD table, conventionally referred to as leaching, is desirable in various applications, for example, where it is desired to reattach the polycrystalline diamond disk to a carbide post, which is typically accompanied by re-infiltration of, for example, a binder material in order for such re-attachment to be successful. The carbide grains can potentially block the pathways along which re-infiltration occurs. These blockages prevent the complete re-infiltration of the binder material during the reattachment cycle, which in turn has deleterious consequences for the reattachment process.

Also, the residual presence of solvent/catalyst material in the microstructural interstices is believed to have a detrimental effect on the performance of PCD compacts at high temperatures as it is believed that the presence of the solvent/catalyst in the diamond table reduces the thermal stability of the diamond table at these elevated temperatures.

To improve the performance and heat resistance of a surface of the body of PCD material 20, at least a portion of the metal-solvent catalyst, such as cobalt, and at least a portion of the additions to the PCD, such as carbide additions if present, may be removed from the interstices 22 of at least a portion of the PCD material 20. Additionally, tungsten and/or tungsten carbide may be removed from at least a portion of the body of PCD material 20 if present therein.

Chemical leaching is used to remove the metal-solvent catalyst and the additions from the body of PCD material 20 either up to a desired depth from an external surface of the body of PCD material or from substantially all of the PCD material 20. Following leaching, the body of PCD material 20 may therefore comprise a first volume that is substantially free of a metal-solvent catalyst. However, small amounts of catalyst may remain within interstices that are inaccessible to the leaching process. Additionally, following leaching, the body of PCD material 20 may also comprise a volume that contains a metal-solvent catalyst. In some embodiments, this further volume may be remote from one or more exposed surfaces of the body of PCD material 20.

The interstitial material which may include, for example, the metal-solvent/catalyst and one or more additions in the form of carbide additions, may be leached from the interstices 22 in the body of PCD material 20 by exposing the PCD material to a suitable leaching solution.

Control of the where the PCD element is leached may be important for a number of reasons. Firstly, it may be desirable not to remove the catalyst from all areas of the PCD, such as regions that are not exposed to such extreme heat or that may benefit from the mechanical strength conferred by the catalyst. Secondly, the substrate is typically made of a material such as tungsten carbide whose resistance to harsh leaching conditions is far less than that of the diamond matrix. Accordingly, exposure of the substrate to the leaching mixture may cause serious damage to the substrate, often rendering the PCD element as a whole useless. Thirdly, the presence of the catalyst in the PCD near the substrate may be useful to assist in strengthening the region of the interface between the substrate and the PCD so that the PCD body does not separate from the substrate during use of the element. It may therefore be important to protect the interface region from the leaching mixture.

Various systems for protecting non-leached portions of a PCD element are known to include, for example, encasing the PCD element in a protective material and removing the masking material from the regions to be leached, or coating the portion of the element to not be leached with a masking material.

Figure 3:
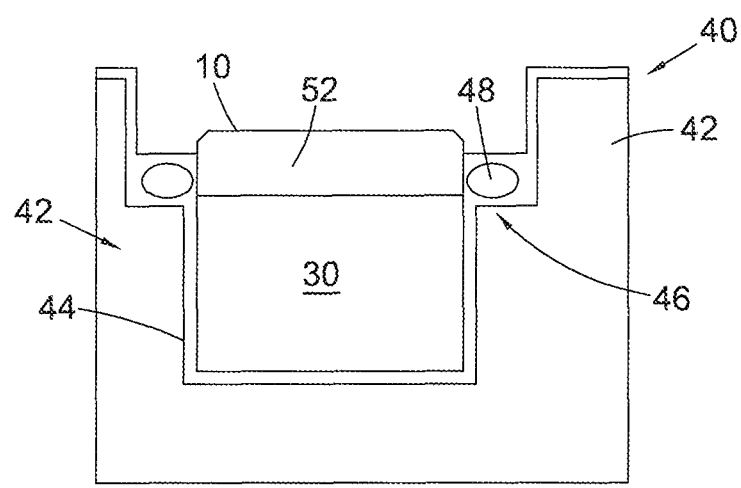
FIG. 3 is a schematic cross-sectional view of the PCD cutter of FIG. 1 being held in a support structure during a treatment process.

FIG. 3 is an example of a possible leaching system 40 suitable for use with embodiments of a support described herein. The leaching system 40 includes a support 42 comprising a cup portion 44 having an upper rim 46 defining an aperture into which is located the PCD element 10 to be leached. A sealing element 48 such as an elastomeric o-ring seal is located on a flange adjacent the rim of the cup portion 44 or may be locatable in a groove in the inner peripheral wall defining the aperture in the support and acts to extend around a portion of the PCD element 10 to be leached to separate the portion 52 of the PCD to be leached from the portion of the PCD element which is not to be leached, including the substrate 30 bonded thereto. The support 42 is shaped to leave exposed the region of the PCD element which is to be subjected to the leaching mixture during the treatment process. The cup 44 and sealing element 48 shown in FIG. 3 are therefore designed to encapsulate the desired surfaces of the substrate 30 and part of the PCD element 10 which are not to be leached.

As shown in FIG. 3, the support 42 is configured as having a cylindrical cup portion 44 with an inside surface diameter that is sized to fit concentrically around the outside surface of the PCD element 10 to be processed. The groove or flange in or on which is located the sealing element 48 extends circumferentially around an inner rim positioned adjacent to an end of the cup portion 44. In an alternative embodiment (not shown), the support 42 may be configured without a groove and a suitable seal may simply be interposed between the opposed respective PCD element 10 and support 42 outside and inside diameter surfaces. When placed around the outside surface of the PCD element 10, the seal 48 operates to provide a leak-tight seal between the PCD element 10 and the support 42 to prevent unwanted migration of the leaching agent therebetween.

In preparation for treatment, the support 42 is positioned axially over the PCD element 10 and the PCD element 10 is located into the support 42 with the working surface of the PCD element 10 protruding from the cup portion 44 and projecting a desired distance outwardly from sealed engagement with the inside wall of the cup portion 44. Positioned in this manner within the support 42, the working surface of the PCD element 10 is freely exposed to make contact with the leaching agent.

The PCD element 10 and support fixture 42 form an assembly 40 that are then placed into a suitable container (not shown) that includes a desired volume of the leaching agent. In some embodiments, the leaching vessel may be a pressure vessel.

In a preferred embodiment, the level of the leaching agent within the container is such that the working surface of the PCD element 10 that is exposed within the support fixture is completely immersed into the leaching agent.

In some embodiments, the PCD element 10 and support fixture 42 may be first placed in a leaching vessel and then the leaching agent may be added, or the leaching agent may be added to the leaching vessel before the PCD element 10 is placed in the leaching vessel. This step may be performed by hand or using an automated system, such as a robotic system.

The leaching agent may be any chemical leaching agent. In particular embodiments, it may be a leaching agent as described herein.

The leaching process may be aided by stirring the leaching agent or otherwise agitating it, for example by ultrasonic methods, vibrations, or tumbling.

Leaching may take place over a time span of a few hours to a few months. In particular embodiments, it may take less than one day (24 hours), less than 50 hours, or less than one week. Leaching may be performed at room temperature or at a lower temperature, or at an elevated temperature, such as the boiling temperature of the leaching mixture.

The duration and conditions of the leaching treatment process may be determined by a variety of factors including, but not limited to, the leaching agent used, the depth to which the PCD element 10 is to be leached, and the percentage of catalyst to be removed from the leached portion of the PCD element 10.

According to embodiments described herein, the support 42 is formed from or coated with a polyketone based plastics material such as a polyaryletherketone (eg polyetheretherketone (PEEK), PEK, or PEEKK). Tecapeek is a trade mark of Ensinger (Germany) and is an example of a suitable polyketone based plastic which may be used in embodiments.

Without wishing to be bound by theory, it has been surprisingly appreciated that polyketone based plastics materials such as PEEK may function well in combination with the leaching mixture described below whereas other materials such as PTFE which are conventionally used for such fixtures tend to disintegrate in use. This general non-reactivity of polyketone based plastics materials such as PEEK may allow the support 42 to withstand leaching process conditions and to be reused multiple times.

Furthermore, such a support structure 42 may be able withstand leaching conditions for long periods of time at high temperatures.

In selected embodiments, rather than being made entirely of a polyketone-based plastics material such as PEEK, the support 42 may merely be coated entirely or in part with such a material, or it may contain a portion comprising the polyketone-based plastics material.

In some embodiments, the sealing element 48 may also be formed from a polyketone based plastics materials such as PEEK or another protective elastomer material.

In most instances, the PCD element 10 may be inserted into and removed from the support fixture 42 by hand but this operation could be automated.

The PCD element 10 may be any type of element to be leached, including a cutter as shown in FIGS. 1 and 2.

According to some embodiments, the body of PCD material 20 may be exposed to the leaching solution at an elevated temperature, for example to a temperature at which the acid leaching mixture is boiling. Exposing the body of PCD material 20 to an elevated temperature during leaching may increase the depth to which the PCD material 20 may be leached and reduce the leaching time necessary to reach the desired leach depth.

Additionally, in some embodiments, at least a portion of the body of PCD material 20 and the leaching solution may be exposed to at least one of an electric current, microwave radiation, and/or ultrasonic energy to increase the rate at which the body of PCD material 20 is leached.

In some embodiments, the leaching depth may be less than 0.05 mm, less than 0.1 mm, less than 1 mm, less than 2 mm, or less than 3 mm, or greater than 0.4 mm. In some embodiments, at least 85%, at least 90%, at least 95%, or at least 99% of the catalyst may be removed to the leaching depth from the leached portion of the PDC element. The leaching depth and amount of catalyst removed may be selected based on the intended use of the PCD element 10.

Once leached to the desired depth, the PCD element 10 and support fixture 42 are removed from the leaching vessel. This may occur prior to or after removal of the leaching agent from the leaching vessel. After removal, the PCD element 10 may optionally be washed, cleaned, or otherwise treated to remove or neutralize residual leaching agent. Finally, the PCD element 10 is removed from the support fixture 42.

All of these steps may also be performed by hand or using an automated system, such as a robotic system.

In a further embodiment, the support fixture 42 may be reused in the same process one or more additional times.

Conventionally, HF—HNO$_3$ has been shown to be the most effective media for the removal of tungsten carbide (WC) from a sintered PCD table. The problem with HF—HNO$_3$ is that it is volatile and, when heating this acid, specific technology, for example, gas sealing technology, is required. If such technology is not provided then the application of temperature will reduce the efficacy of HF—HNO$_3$ due to evaporation of the HF (which is poisonous) and formation of NO species, which are usually gaseous, and thus frequent replenishment of the acid media is required. Furthermore, as outlined above heat would ordinarily be required to accelerate the leaching process in order to render the process commercially feasible. Another problem is that HF—HNO$_3$ is corrosive to most containment vessels making the reaction difficult to perform.

HCl and other similar mineral acids are easier to work with at high temperatures than HF—HNO$_3$ and are aggressive towards the catalyst/solvent, particularly cobalt (Co). HCl, for example, may remove the bulk of the catalyst/solvent from the PCD table in a reasonable time period, depending on the temperature, typically in the region of 80 hours, although it does not remove WC and it has been appreciated by the present applicant that HCl alone is not suitable for removing the non-diamond phase additions, such as VC from the PCD table.

The above-described leaching support fixture 42 may be used in conjunction with or separate from the leaching agents and methods also described herein.

A suitable leaching agent for use with the support fixture 42 described above which is less toxic than conventional HF—HNO$_3$ leaching mixtures and which works efficiently to remove additions such as WC and Co from the PCD table, comprises nitric acid diluted in water, wherein the nitric acid comprises between around 2 to 5 wt % in the nitric acid and water mixture, and one or more additional mineral acids. Examples of suitable additional mineral acids may include, for example, hydrochloric acid, phosphoric acid, sulphuric acid, hydrofluoric acid, and/or any combination of the foregoing mineral acids.

In some embodiments, nitric acid may be present in the leaching mixture of some embodiments in an amount of, for example, between 2 to 5 wt % and/or a molar concentration of up to around 1.3M. In some embodiments, one or more mineral acids may be present in the leaching solution at a molar concentration of up to around, for example, 7M.

Some embodiments are described in more detail with reference to the following examples which are not intended to be limiting. The following examples provide further detail in connection with the embodiments described above.

Example 1

Cutting elements, each comprising a PCD table attached to a tungsten carbide substrate, were formed by HPHT sintering of diamond particles having an average grain size of about 10 microns in the presence of cobalt. The sintered-polycrystalline-diamond tables included cobalt and tungsten within the interstitial regions between the bonded diamond grains together with 3 wt % vanadium carbide.

The PCD table was leached using a solution comprising 6.9 M hydrochloric acid, and 1.13 M nitric acid diluted in water. The PCD table was leached for 30 hours at a temperature at which the acid leaching mixture was boiling and ultrasound was applied after a period of leaching to remove remnant reactants.

After leaching, leached depths of the PCD table were determined for various portions of the PCD table, through x-ray analysis.

The resultant leach depths achieved are shown below in Table 1 for Example 1 and the following examples. In example 1, the average leach depth achieved using the aforementioned leaching mixture over a period of 30 hours was 144 microns.

Example 2

Cutting elements, each comprising a PCD table attached to a tungsten carbide substrate, were formed by HPHT sintering of diamond particles having an average grain size of about 10 microns in the presence of cobalt. The sintered-polycrystalline-diamond tables included cobalt and tungsten within the interstitial regions between the bonded diamond grains together with 3 wt % vanadium carbide.

The PCD table was leached using a solution comprising 6.9 M hydrochloric acid, and 1.13 M nitric acid diluted in water. The PCD table was leached for 30 hours at a temperature at which the acid leaching mixture was boiling.

After leaching, leached depths of the PCD table at various points were determined for various portions of the PCD table, through x-ray analysis.

The average leach depth achieved using the aforementioned leaching mixture over a period of 30 hours was 161 microns.

Example 3

Cutting elements, each comprising a PCD table attached to a tungsten carbide substrate, were formed by HPHT sintering of diamond particles having an average grain size of about 10 microns in the presence of cobalt. The sintered-polycrystalline-diamond tables included cobalt and tungsten within the interstitial regions between the bonded diamond grains together with 3 wt % vanadium carbide.

The PCD tables were leached using a solution comprising 6.9 M hydrochloric acid, and 0.36 M nitric acid diluted in water. The PCD tables were leached for 10 hours at a temperature at which the acid leaching mixture was boiling.

After leaching, leached depths of the PCD tables at various points were determined for various portions of the PCD table, through x-ray analysis.

The average leach depth achieved using the aforementioned leaching mixture over a period of 10 hours was 202 microns for some tables and an average leach depth of 211.5 microns was achieved for other PCD tables.

Example 4

Cutting elements, each comprising a PCD table attached to a tungsten carbide substrate, were formed by HPHT sintering of diamond particles having an average grain size of about 10 microns in the presence of cobalt. The sintered-polycrystalline-diamond tables included cobalt and tungsten within the interstitial regions between the bonded diamond grains together with 3 wt % vanadium carbide.

The PCD tables were leached using a solution comprising around 7M hydrochloric acid (for example 6.9 M), and 0.59 M nitric acid diluted in water. The PCD tables were leached for 10 hours at a temperature at which the acid leaching mixture was boiling.

After leaching, leached depths of the PCD tables at various points were determined for various portions of the PCD tables, through x-ray analysis.

In some cutters, the average leach depth achieved using the aforementioned leaching mixture over a period of 10 hours was 139.5 microns and in others a leach depth of 218.5 microns was achieved.

Example 5

Cutting elements, each comprising a PCD table attached to a tungsten carbide substrate, were formed by HPHT sintering of diamond particles having an average grain size of about 10 microns in the presence of cobalt. The sintered-polycrystalline-diamond tables included cobalt and tungsten within the interstitial regions between the bonded diamond grains together with 3 wt % vanadium carbide.

The PCD table was leached using a solution comprising around 7M hydrochloric acid, for example 6.9M, and 0.24 M nitric acid diluted in water. The PCD table was leached for 10 hours at a temperature at which the acid leaching mixture was boiling.

After leaching, leached depths of the PCD table at various points were determined for various portions of the PCD table, through x-ray analysis.

The average leach depth achieved using the aforementioned leaching mixture over a period of 10 hours was 153 microns.

TABLE 1

| PCD and leaching composition | Molar concentration HCl | Molar concentration HNO$_3$ | Leach depth (microns) | | |
|---|---|---|---|---|---|
| | | | Side a | Side b | Average |
| PCD + 3 wt % VC leached in HCl/H2O/HNO3 (10 wt %) 30 hrs heat and ultrasound | 6.9 | 1.13 | 97 | 191 | 144 |
| PCD + 3 wt % VC leached in HCl/H2O/HNO3 (10 wt %) 30 hrs heat | 6.9 | 1.13 | 172 | 150 | 161 |
| PCD + 3 wt % VC leached in HCl/H2O/HNO3 (3 wt %) 10 hrs | 6.9 | 0.36 | 196 | 208 | 202 |
| PCD + 3 wt % VC leached in HCl/H2O/HNO3 (5 wt %) 10 hrs | 6.9 | 0.59 | 143 | 136 | 139.5 |
| PCD + 3 wt % VC leached in HCl/H2O/HNO3 (3 wt %) 10 hrs | 6.9 | 0.36 | 223 | 200 | 211.5 |
| PCD + 3 wt % VC leached in HCl/H2O/HNO3 (5 wt %) 10 hrs | 6.9 | 0.59 | 226 | 211 | 218.5 |
| PCD + 3 wt % VC leached in HCl/H2O/HNO3 (2 wt %) 10 hrs | 6.9 | 0.24 | 170 | 136 | 153 |

When compared with the leach depths achievable using conventional leaching solutions, it has been determined that the embodiments including the above leaching mixtures may enable a greater leaching efficiency to be achieved with greater leach depths being achievable in a shorter period of time. Furthermore, the nature of the components forming the acid leaching mixture of embodiments also enable carbide additions to be leached from the PCD material, in addition to conventional binder-solvent present in the PCD. Also, health and safety handling issues are reduced as the acid leaching mixture is less toxic than other conventional HF-nitric based leaching mixtures.

It was also found that, in the above examples, the support fixture 42 for the PCD elements, which was formed of PEEK, did not disintegrate during use and was therefore reusable.

Chemical leaching may be used to remove the metal-solvent catalyst and any additions from the body of super hard material 20 either up to a desired depth from an external surface of the body of PCD material or from substantially all of the super hard material 20. Following leaching, the body of super hard material 20 may therefore comprise a first volume that is substantially free of a metal-solvent catalyst. However, small amounts of catalyst may remain within interstices that are inaccessible to the leaching process. Additionally, following leaching, the body of super hard material 20 may also comprise a volume that contains a metal-solvent catalyst. In some embodiments, this further volume may be remote from one or more exposed surfaces of the body of super hard material 20.

The thermally stable region, which may be substantially porous, may extend, for example, a depth of at least about 50 microns or at least about 100 microns from a surface of the PCD structure. Some embodiments may have a leach depth greater than around 250 microns or greater than around 450 microns and in some embodiments substantially all of the catalysing material may be removed from the body of polycrystalline material.

It is to be understood that the exact depth of the thermally stable region can be selected to and will vary depending on the desired particular end use drilling and or cutting applications.

The preceding description has been provided to enable others skilled the art to best utilize various aspects of the embodiments described by way of example herein. This description is not intended to be exhaustive or to be limited to any precise form disclosed. Many modifications and variations are possible. In particular, whilst the method has been described as being particularly effective in leaching PCD containing VC additives, it is equally applicable to the effective leaching of PCD with other additives such as those in the form of other metal carbides including one or more of a carbide of tungsten, titanium, niobium, tantalum, zirconium, molybdenum, or chromium. Furthermore, whilst the use of a polyketone-based plastics material for the support fixture has been described as being particularly effective for use with the described leaching agent composition, it will be appreciated that the fixture is not limited to use with this leaching agent. In addition the shape of the fixture illustrated and described should not be taken to be limiting as other shapes of fixture will be appreciated.

The invention claimed is:

1. A method of processing a body of polycrystalline diamond (PCD) material having a non-diamond phase comprising a diamond catalyst/solvent and/or one or more metal carbides, the method comprising:

locating the body of PCD material to be processed in a support formed of or coated with a polyketone based plastics material;

forming a sealing closure between the body PCD material and the support to separate a region of the body of PCD material to be treated from a region not to be treated;

inserting the body of PCD material and support into a leaching vessel, the leaching vessel containing an amount of leaching mixture;

leaching an amount of the diamond catalyst/solvent and/or one or more metal carbides from the PCD material by exposing at least a portion of the PCD material to the leaching mixture; wherein, the leaching mixture comprises nitric acid diluted in water, the nitric acid comprising between around 2 to 5 wt % in the nitric acid and water mixture, and one or more additional mineral acids.

2. The method of claim 1, wherein the one or more additional mineral acids comprise one or more of hydrochloric acid, sulphuric acid, phosphoric acid and hydrofluoric acid.

3. The method of claim 1, wherein the leaching mixture comprises the one or more additional mineral acids at a molar concentration of up to around 7M.

4. The method of claim 1, wherein the leaching mixture comprises the one or more additional mineral acids at a molar concentration of around 7M.

5. The method of claim 1, wherein the leaching mixture comprises nitric acid at a molar concentration of up to around 1.3 M.

6. The method of claim 1, wherein the leaching mixture comprises nitric acid at a molar concentration of between around 0.2 M to around 1.2 M.

7. The method of claim 1, further comprising heating the leaching mixture to a temperature equal to or greater than the boiling temperature of the leaching mixture during the step of exposing the PCD material to the leaching mixture.

8. The method of claim 1, wherein the solvent/catalyst comprises cobalt, nickel and/or iron.

9. The method of claim 1, wherein the step of leaching comprises leaching one or more of a carbide of tungsten, titanium, niobium, tantalum, zirconium, molybdenum, chromium, or vanadium from the PCD material.

* * * * *